(12) United States Patent
Dozza

(10) Patent No.: US 8,786,421 B2
(45) Date of Patent: Jul. 22, 2014

(54) METHOD AND SYSTEM TO ENHANCE TRAFFIC SAFETY AND EFFICIENCY FOR VEHICLES INCLUDING CALCULATING THE EXPECTED FUTURE DRIVER'S BEHAVIOR

(75) Inventor: Marco Dozza, Angered (SE)

(73) Assignee: Volvo Technology Corporation, Göteborg (SE)

( * ) Notice: Subject to any disclaimer, the term of this patent is extended or adjusted under 35 U.S.C. 154(b) by 395 days.

(21) Appl. No.: 13/263,340

(22) PCT Filed: Apr. 7, 2009

(86) PCT No.: PCT/SE2009/000182
§ 371 (c)(1),
(2), (4) Date: Oct. 19, 2011

(87) PCT Pub. No.: WO2010/117308
PCT Pub. Date: Oct. 14, 2010

(65) Prior Publication Data
US 2012/0025969 A1    Feb. 2, 2012

(51) Int. Cl.
*G08B 21/00* (2006.01)
(52) U.S. Cl.
USPC .......................... 340/468; 340/901; 701/301
(58) Field of Classification Search
CPC ........................................................ B60Q 1/44
USPC .......... 340/463–467, 468, 902, 903; 700/300, 700/301; 701/300, 301
See application file for complete search history.

(56) References Cited

U.S. PATENT DOCUMENTS

| | | | |
|---|---|---|---|
| 6,525,656 B1 | 2/2003 | Hahn | |
| 6,850,156 B2 | 2/2005 | Bloomfield et al. | |
| 7,018,004 B2 | 3/2006 | Chen et al. | |
| 2005/0096835 A1 | 5/2005 | Piwonka et al. | |
| 2005/0182539 A1 | 8/2005 | Maass | |
| 2008/0122652 A1 | 5/2008 | Tengler et al. | |
| 2008/0186154 A1 | 8/2008 | Haug | |

FOREIGN PATENT DOCUMENTS

| | | |
|---|---|---|
| JP | 2005132338 A2 | 5/2005 |
| JP | 2006202061 A2 | 8/2006 |
| JP | 2007320412 A2 | 12/2007 |
| JP | 2008210058 A2 | 9/2008 |
| JP | 2009037415 A2 | 2/2009 |
| WO | 9804435 A1 | 2/1998 |

OTHER PUBLICATIONS

International Search Report for corresponding International Application PCT/SE2009/000182.
International Preliminary Report on Patentability for corresponding International Application PCT/SE2009/000182.
Japanese Official Action (translation)(May 28, 2013) from corresponding Japanese App. JP2012-504648.

*Primary Examiner* — Jeffery Hofsass
(74) *Attorney, Agent, or Firm* — WRB-IP LLP

(57) ABSTRACT

A method is provided for enhancing safety and traffic efficiency for vehicles transmitting information on an expected behavior of a driver of an ego vehicle in response to a stimulus including the steps of (i) sensing a parameter of the stimulus in order to generate a stimulus signal function of the sensed parameter, (ii) monitoring the stimulus signal function of the sensed parameter, (iii) calculating an expected future driver's behavior in response to the stimulus using said stimulus signal, (iv) comparing the expected future driver behavior with a standard driver behavior, and (v) emitting a warning signal to the surrounding of the ego vehicle in case the expected future driving behavior is not a standard behavior. Additionally, a system operating according to said method is disclosed.

23 Claims, 4 Drawing Sheets

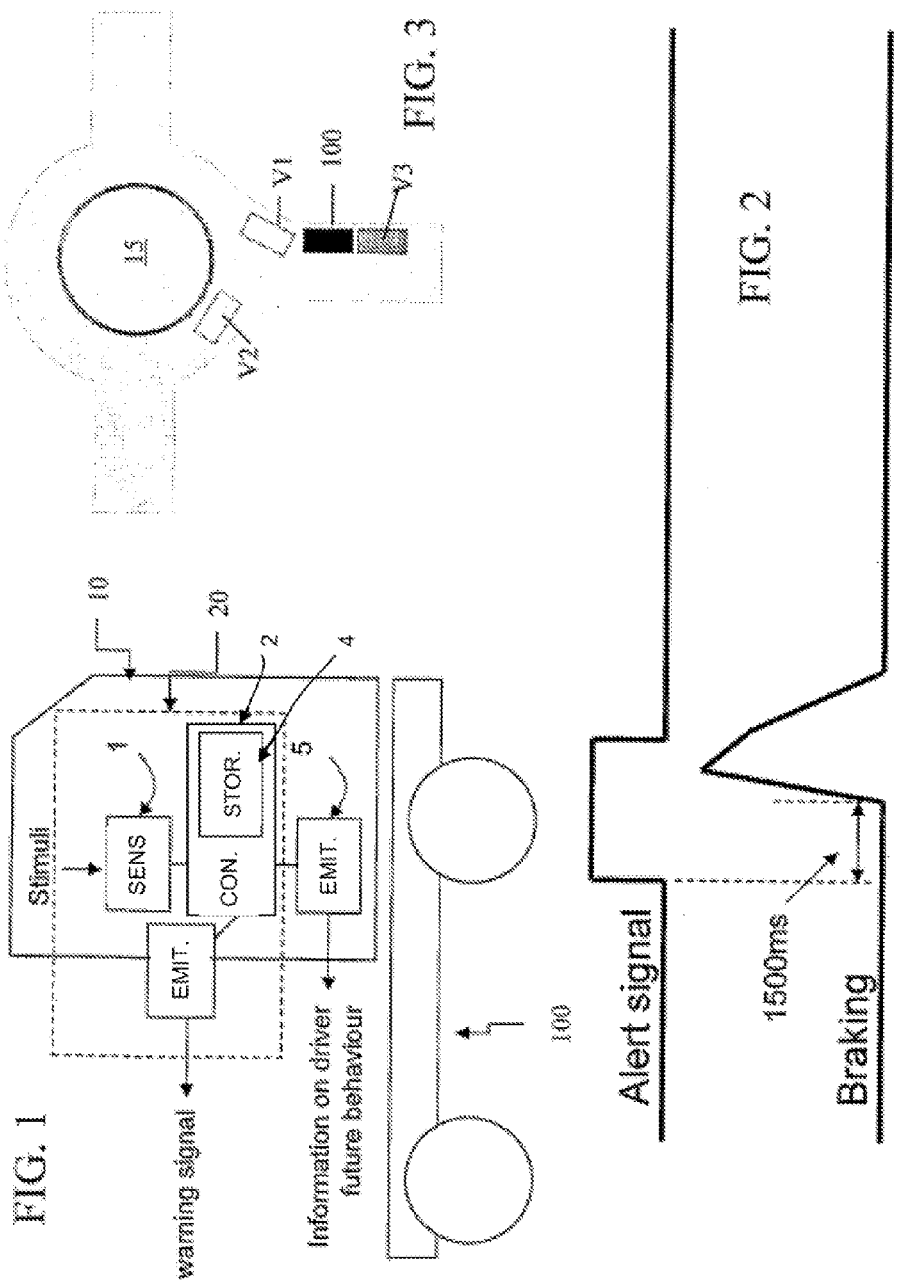

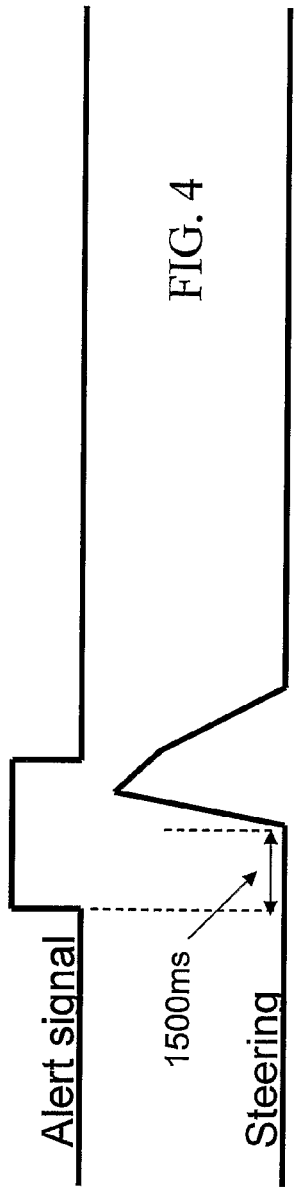
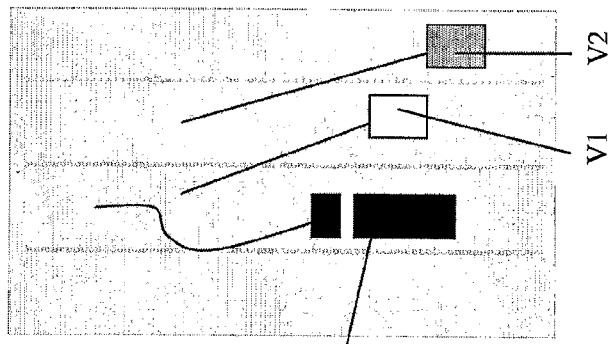
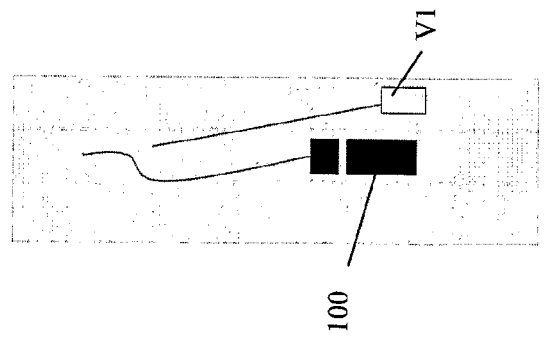
FIG. 4
FIG. 5b
FIG. 5a

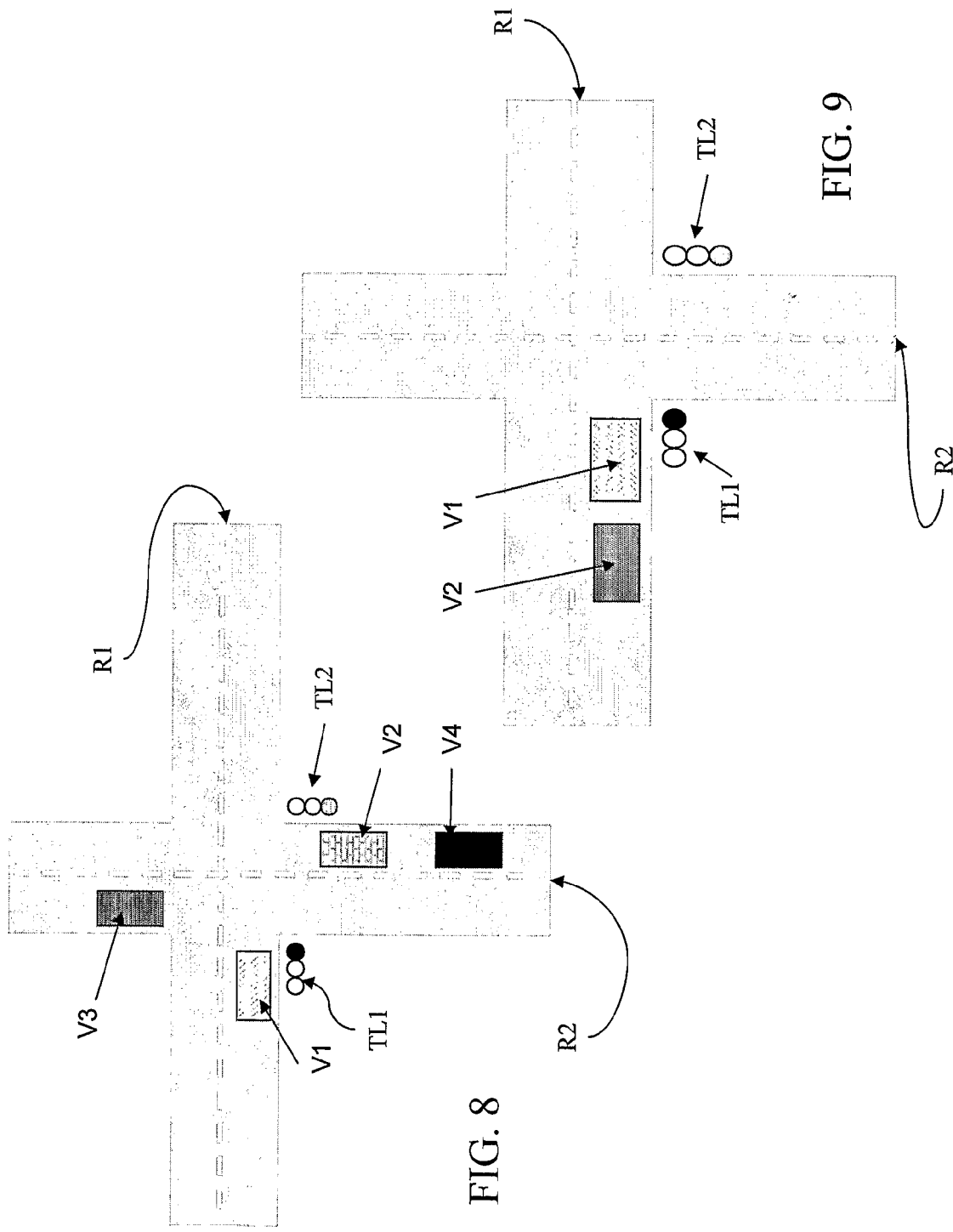

METHOD AND SYSTEM TO ENHANCE TRAFFIC SAFETY AND EFFICIENCY FOR VEHICLES INCLUDING CALCULATING THE EXPECTED FUTURE DRIVER'S BEHAVIOR

BACKGROUND AND SUMMARY

The invention relates to a method and a system to enhance traffic safety and efficiency for vehicles by transmitting information on the expected behavior of a vehicle, in particular in relation to an expected hazardous manuever of the vehicle, to the surrounding vehicle(s), infrastructures or other road users.

Technological background Many different on-board safety systems for vehicles to increase the safety and security of all roadway users are known.

An example of these systems is the Forward Collision Warning system ("FCW") which is an electronic system that monitors the roadway in front of the host vehicle and warns the driver when a potential collision risk exists. These systems are generally based on sensors, like radars, to determine—for example—distance and relative speed between the host vehicle equipped with the FCW and the vehicle ahead of it. An electronic control unit ("ECU") elaborates the signals from the sensors and outputs a status indicator and, when necessary, the warning to the driver.

Other known safety systems may include a Lane Departure Warning system ("LDW"), which is a mechanism designed to warn a driver when the vehicle begins to move out of its lane on freeways and arterial roads. The Lane Change Warning system ("LCW"), which increases the awareness of drivers of vehicles in close proximity travelling on adjacent lanes, and the Curve>> Speed Warning system ("CSW"), which warns the driver when he/she is travelling too fast for an upcoming curve, are other systems which may be present, alone or in combination, within a vehicle.

The warning signal issued by any of those systems in order to warn the driver of a threat may cause an unexpected reaction of the driver, unexpected from the point of view of the other road users surrounding the vehicle, such as for example a sudden breaking or a sudden steering manuever. Due to the fact that these manuevers are hazardous for the other vehicles in proximity of the one performing such action, it is desirable to warn the other road users as soon as possible of the possibility of such a reaction to occur.

U.S. Pat. No. 6,525,656 concerns a system for providing advanced warning or advanced information of other road users via a vehicle, which includes an optical signal device for detection of other road users, with a sensor for automatic recognition of situations, which may possibly require an advanced warning or advanced information for other road users. When such a situation is recognized, the signal device is activated at least once for a short duration, of which the duration is below the conscious detection threshold and above the subconscious detection threshold of the road user.

US 2008/0186154 proposes a method and a device in which the warning signal produced upon departure from the lane is dependent on the lane used and/or is dependent on the side at which the departure takes place and/or is dependent on the driver's behavior.

EP 0918661 A1 discloses signalling means adapted for use in a vehicle, the signalling means being activated in response to a signal from a sensing means, the sensing means being adapted to sense movement of the braking operating part of the driver in a direction likely to result in the brakes associate with that vehicle being applied, such as, for example, movement of the driver's foot from the accelerator pedal towards the brake pedal. The signalling means may comprise a stop lamp or other light emitting source mounted at the upper part of the vehicle and being visible to drivers of following vehicles. This known solution enables drivers of the following vehicles to obtain advance warning of potential hazardous situation arising through imminent deceleration of the vehicle in front.

The described signalling means therefore are activated only after the beginning of the braking manuever (i.e. the foot of the driver has to move towards the braking pedal) by the driver.

U.S. Pat. No. 7,018,004 describes a system and a method for brake pre-charging which includes pre-filling brakes, based on proximity information from a forward-looking sensor, to reduce the initial delay associated with braking. By reducing the initial delay in converting driver brake pressure requests into actual brake torque to the wheels, the stopping distance required for braking is reduced.

U.S. Pat. No. 6,850,156 discloses an anti-collision safety system for a vehicle which includes a microprocessor which receives one or more inputs and controls an output of at least one indicator or signalling device in response to the inputs. The microprocessor may be continuously powered or energized when the vehicle is in use, such that the indicator may be modulated in situations when the brake pedal of the vehicle is not applied. Preferably, a proximity sensing device may be provided to detect objects exteriorly of the vehicle. Preferably, an accelerometer may also be included to provide a deceleration signal to the microprocessor. The microprocessor may modulate the indicator independent of actuation of the brake pedal by a driver of the vehicle.

It is desirable to further enhance the security and efficiency of a vehicle hosting a safety system, as well as of the vehicles surrounding the mentioned hosting vehicle. In addition, it is desirable to reduce the risk of accidents caused by the emission of signals by the safety systems know in the art.

The present invention relates, according to an aspect thereof, to a method and a system to enhance traffic safety and efficiency. In particular, the system of an aspect of the invention is apt to be installed in a vehicle, of any generic type, and it generates a warning signal—under certain conditions more in detail described below—in order to warn the surrounding of a non-standard manuever, which probably is going to happen in the nearby future, of the vehicle including the system, which manuever has been triggered by a stimulus.

With the term "surrounding", other vehicles, infrastructures or road user(s) and even the driver of the vehicle itself are meant. In addition, the vehicle in which the system of an aspect of the invention is installed is called in the following "ego vehicle".

Indeed, any non-standard manuever of a vehicle may trigger a chain of reactions and cause additional hazardous manuevers by the surrounding vehicles. It is therefore a goal of an aspect of the invention to warn the surrounding, i.e. the other vehicles or infrastructures or additional road users and/or the driver of the ego vehicle itself, in a particular condition more in detail described below, as soon as possible of the fact that there is a certain probability (e.g. the calculated probability that such an action is above a certain threshold) that such a non-standard manuever is going to take place. Increasing the time that elapses between the warning and the moment in which the manuever takes place in reality allows the risk of accidents to decrease and it may also increase the efficiency of the traffic taken as a whole.

According to a first aspect, the present invention relates to a method for enhancing traffic safety and efficiency for vehicles by transmitting information on an expected behavior of a driver of an ego vehicle in response to a stimulus including the step of elaborating a stimulus signal function of a sensed parameter of said stimulus, characterised in that it further comprises the steps of calculating the expected future driver's behavior in response to said stimulus using said stimulus signal, comparing said expected future driver's behavior with a standard driver's behavior, generating a warning signal to be emitted to the surrounding of said ego vehicle in case said expected future driver's behavior is not a standard behavior.

The present invention, in the aforesaid aspect, may have at least one of the preferred characteristics indicated hereinafter.

The method preferably includes the additional step of sensing a parameter of the stimulus, for example via a sensor, in order to generate the stimulus signal function of said sensed parameter.

In case a safety system is present in an ego vehicle, such as a FCW system, a LDW system, a CSW system, etc., it has been noted that, when such a known safety system emits an alert signal in order to alert the driver of said ego vehicle, such alert signal—that can be considered as a stimulus to which the driver reacts to—itself may cause under some circumstances an unexpected reaction of the driver. Also for such a case, it is therefore desirable that the surrounding is warned that such a non-standard reaction of the driver is probably going to happen.

In the following, the term "warning signal" indicates the signal emitted by the system of an aspect of the invention or by the method of an aspect of the invention in order to warn the surrounding of the ego driver's future expected non-standard behavior. On the other hand, the term "alert signal" indicates a signal emitted to alert the driver of the ego-vehicle. According to a preferred embodiment of the invention, such an alert signal can be emitted by a safety system present in the ego-vehicle, such as the FCW system, the LDW system, the CSW system, etc. This alert signal emitted by the safety system may trigger the emission of a warning signal by the system of an aspect of the invention.

In another preferred embodiment of the invention, the stimulus is coming from another system for enhancing traffic safety and efficiency placed in another vehicle: assuming that at least two vehicles in the traffic have a system according to an aspect of the invention to enhance traffic safety and efficiency on-board, preferably a communication between the two ego vehicles is established and an exchange and mutual updating of information, preferably via a wireless communication, takes place.

In an alternative preferred embodiment of the system according to the invention, the stimulus is coming from an "infrastructure", called "intelligent infrastructure", which is capable of communicating with the system(s) of the ego vehicle(s) to enhance traffic safety and efficiency.

In order to evaluate the expected behavior of the driver in response to the stimulus, a software including an algorithm is used. The expected behavior is thus calculated preferably elaborating information derived from field operational data.

According to a further preferred embodiment, the calculation of the expected future driver's behavior includes an adaptive step and/or a learning step based on the driver's actual responses.

Preferably, in order to calculate the expected future driver's behavior, the method according to an aspect of the invention includes the step of sensing a plurality of different parameters relative to the ego vehicle and/or its surrounding. More preferably, the method also comprises a step of sensing a plurality of parameters relative to the driver's physical conditions. The software used to calculate the expected future driver's behavior uses all this information from these sensors in the calculation in order to output the corresponding calculation result(s).

According to a second aspect, the present invention relates to a system to enhance safety and traffic efficiency for vehicles by transmitting information on an expected behavior of a driver of an ego vehicle in response to a stimulus, said system comprising: a sensor of a first type apt to sense a parameter related to said stimulus and to generate a stimulus signal function of said sensed parameter,—a controller in communication with said sensor of the first type and apt to process said stimulus signal from said sensor of the first type, characterized in that said controller is apt to compute the expected driver's behavior based on the stimulus signal from said sensor of the first type and to compare said expected driver's behavior to a standard behavior, a transmission device is comprised that is apt to transmit to said ego vehicle's surrounding a warning signal in case said expected driver's behavior is not a standard behavior.

According to a preferred embodiment of the invention, a software resident on a storage medium is in signal communication with the controller, and said software is apt to compute the expected driver's behavior based on the stimulus signal from said sensor of the first type and to compare said expected driver's behavior to a standard behavior.

According to another preferred embodiment of the invention, the transmission device is a wireless transmitter.

Preferably, the system to enhance traffic safety and efficiency for vehicles additionally comprises a safety system including an emitter to emit an alert signal. More preferably, the safety system is a Forward Collision Warning system or a Lane Departure Warning system or a Lane-Change Warning system or a Curve Speed Warning system and said alert signal is a Forward Collision Warning or a Lane Departure Warning or a Lane-Change Warning or a Curve Speed Warning, respectively.

According to an additional preferred embodiment, the system according to the present invention comprises a sensor of a second type sensing additional parameters relating to said vehicle's external or internal conditions.

Alternatively or in addition, the system also comprises a sensor of a third type sensing additional parameters relating to said driver's physical conditions.

The information coming from these additional sensors are elaborated by the software in order to compute the expected future driver's behavior.

According to a third aspect, the invention is related to a network of vehicles, at least one of said vehicles including a system for enhancing traffic safety and efficiency as described above, the remaining vehicles of the network not including such a system comprising at least one receiver apt to receive signals from said system, each such system present in the network of vehicles comprising a wireless transmission device apt to communicate with the systems and/or the receivers of the other vehicles present in the network.

BRIEF DESCRIPTION OF THE DRAWINGS

Further features and advantages of a method and a system to enhance traffic safety and efficiency for vehicles according to an aspect of the invention will become more clearly apparent from the following detailed description thereof, given with reference to the accompanying drawings, where:

FIG. 1 is a schematic cross-sectional view of an ego vehicle including a system to enhance traffic safety and efficiency according to the present invention;

FIG. 2 represents two curves depicting the average elapsed time between the issue of a frontal collision warning signal and the beginning of the braking action of a driver of the vehicle of FIG. 1;

FIG. 3 is a schematic representation of a first situation in which the method and—system according to an aspect of the invention are used;

FIG. 4 is analogous to FIG. 2 and it represents the average elapsed time between the issue of a lane departure warning signal and the beginning of the steering action of a driver of the vehicle of FIG. 1;

FIG. 5a is a schematic representation of a second situation in which the method and system according to an aspect of the invention are used;

FIG. 5b is a schematic representation of a variation of the situation of FIG. 5a;

FIG. 8 is a schematic representation of a fourth situation in which the method and system according to an aspect of the invention are used;

FIG. 9 is a schematic representation of a fifth situation in which the method and system according to an aspect of the invention are used.

DETAILED DESCRIPTION

Figure 7:
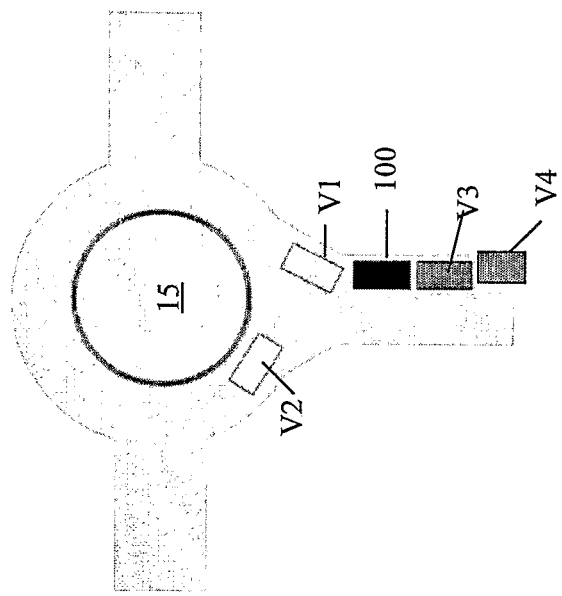
FIG. 7 is a schematic representation of a third situation in which the method and system according to an aspect of the invention are used.

With reference to FIG. 1, 100 globally indicates an ego vehicle, depicted only very schematically in the appended figures, including a system to enhance traffic safety and efficiency 10 realized according to the present invention.

With the term "vehicle" in the following very generally a motorcycle, a moped, a commercial vehicle, such as a truck, or an automobile, a sport utility vehicle and the like is meant.

The system 10 includes one (or more) sensor(s) of a first type 1 to detect a parameter or a set of parameters of a given stimulus, relative to the ego vehicle 100 (therefore, it detects the ego vehicle's internal conditions) and/or its surrounding (ego vehicle's external conditions). The sensor of a first type 1 may detect parameter(s) like the presence and/or the position of objects (in this case, for example, the presence of an object is the stimulus) within a certain distance from the ego vehicle 100, or the ego vehicle's speed or road's conditions. Such sensor of a first type 1 comprises for example radar or sonar sensors, ultrasonic or infrared beam detector devices, cameras, microphones, proximity sensors, laser sensors or a combination thereof.

According to a different preferred embodiment, sensor of a first type 1 may be a receiver apt to detect signals emitted by an additional system to enhance traffic safety and efficiency 10 mounted on a different vehicle from ego vehicle 100. Sensor of a first type 1 may be even capable to detect signals coming from specific infrastructures constructed along roadways, infrastructures which are realized to detect and/or analyze traffic conditions (including road, traffic and weather conditions).

Sensor of a first type 1 is preferably located in a predetermined position on the vehicle 100. The position depends—among others—on the type of sensor 1 and on the parameter(s) to be sensed.

Further, in a preferred embodiment of the invention, the system 10 additionally includes one or more sensors of a second type (not shown in the figures) sensing additional stimuli (parameters) relating to ego vehicle's external or internal conditions which may secondarily influence the driver's behavior. The term "secondarily" is used in order to distinguish these additional parameters collected with reference to additional stimuli from the ones collected by sensor of the first type 1. As said, these parameters sensed by the sensor(s) of the second type may be relative to stimuli external to the ego vehicle 100, such as light level, time of the day, traffic intensity, radar targets, driver coaching system activity, GPS activity, road type and friction, etc.; or internal to the ego vehicle 100, for example phone and other devices activation; etc.

Sensor of the first type 1 and sensor(s) of the second type then generate stimulus signals function of these sensed parameters.

Alternatively, instead of being sensed and generated by the mentioned sensor(s) of the second type, the above listed stimulus signals may be accessed on the vehicle Controller-Area Network (CAN or CAN-bus), when available.

Preferably, the system 10 also includes a third type of sensor(s), also not shown in the figures, i.e., cameras, seeing machines, sensors for electromyography (EMG), electroencephalography (EEG), skin conductance, etc., to collect information about the driver, and these information can be used to evaluate his/her overall physical condition, including age, whether he/she is under the effect of drugs and/or alcohol, etc., and workload which influences his/her attention' (driver's conditions and activity).

Figure 6:
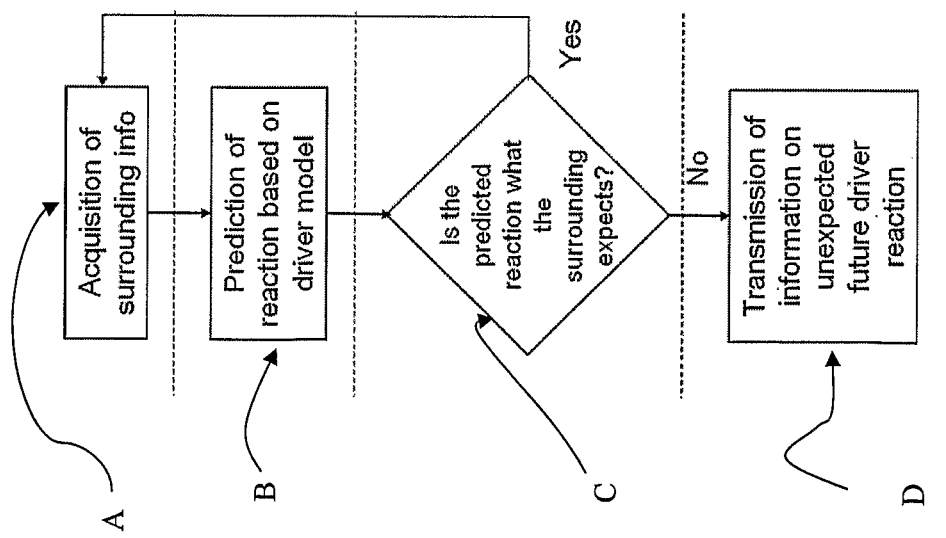
FIG. 6 is a flowchart depicting the steps of the method according to the present invention.

The collection of all possible parameters relative to the ego vehicle's 100 external conditions, and/or relative to ego vehicle's internal conditions and/or relative to the driver's conditions and activity through sensor(s) represents the first step A of the method according to an aspect of the invention as depicted in FIG. 6.

Sensor of the first type 1, and sensor(s) of the second and third type—if present—is/are in electronic communication with a controller 2, such as an electronic control unit ("ECU"). Sensor of the first type 1 and sensors of the second and third type, when present, sends/send to controller 2 the stimulus signals function of the detected parameters: The controller 2 receives and elaborates the stimulus signals.

According to a preferred embodiment of the invention, the controller 2 is apt to generate an alert signal to be broadcasted to the driver of ego vehicle 100 when the conditions/thresholds set up in the system 10 are met, i.e. when the parameter, and thus the consequently generated stimulus signal, sensed by sensor 1 satisfies certain predetermined rules. The rules which have to be satisfied by the parameter sensed by sensor 1 in order to have an alert signal generated by controller 2 are dependent on the type, model and settings of the system 10 under consideration.

Alternatively, the controller 2 may always emit an alert signal which is broadcasted to the driver, said signal being a function of the sensed parameter(s) by sensor of the first type 1. In other words, a signal output by controller 2 is always presented to the driver, which signal changes according to the changes of the vehicle's internal and/or external conditions.

Preferably, the sensor of the first type 1 is part of a safety system 20 (partially shown in appended FIG. 1) installed in the ego vehicle 100. More preferably, the safety system is of a type known in the art, examples of which are FCW systems, LDW systems, LCW systems, CSW systems, etc. In this preferred embodiment, the controller 2 can be the controller already integrated in the safety system 20. In addition, the alert signal described above is the signal to attract the driver's attention issued by the safety system 20 according to the setting of the safety system itself.

As an example, the sensor of the first type 1 can be the sensor(s) of a Forward Collision Warning system (i.e. radars or radio wave radars and image processing systems). The timing of a potential collision between ego vehicle 100 and a potential "obstacle" vehicle is judged by the result of evaluating the ego vehicle 100 speed, the distance to the potential obstacle vehicle, and the relative speed, between ego vehicle 100 and the obstacle vehicle. When the time of collision is lower, than a certain set threshold a collision warning (=alert signal) is issued to inform the driver of the need to take action in order to avoid a collision. In this case therefore the alert signal has a well-defined beginning time and end time.

According to a different embodiment of the invention, the alert signal can be a continuous signal issued by controller 2, such as for example the visualization on a screen, located in the driver's field of view, of the position of the ego vehicle 100 including a Global Positioning System (GPS) receiver. The positions of the ego vehicle and the surrounding are constantly visualized on the monitor and updated. Depending on the update time, there is a continuous sequence of alert signals, each lasting the update time, forming the visualized path of the vehicle in the monitor.

The system 10 preferably comprises an emitter 3, which may include for instance a loudspeaker, a monitor, or vibrotactile actuators capable of emitting the signals issued by controller 2, such as the alert signals, as a visual, acoustic, or tactile signal function of the specific parameter detected by sensor 1, to alert the driver of ego vehicle 100 of the potential threat detected or to present to the same the constantly changing overall conditions which need his/her attention.

Additionally, the controller 2 is apt to emit a warning signal under certain conditions, as described more in detail below.

The controller 2 preferably includes also a storage medium 4 (which can be, in an additional embodiment of the invention, also external to the controller 2 and in electronic communication with the same) in which a software is resident, having the functionalities described in the following.

The software starts processing information coming from sensor of the first type 1, and from the other sensor(s) of the second and third type, if present, at ego vehicle 100 engine's ignition, i.e. at ego vehicles 100 start of operation. At each ignition, a new driving session is commenced. Preferably, the previous status of the software before the start of operation of the ego vehicle 100 is saved in a memory (either in storage medium 4 or in an additional memory) so that at the new ignition the end values of the previous driving session can be restored as starting values of the new driving session. Advantageously, also the driver's profile is loaded, so that the particular setting connected to the specific driver who is going to commence the driving session are stored and implemented.

In detail, in a first phase, the software elaborates the information coming from the driver profile and the previous driving session(s). Then, in a second phase, all parameters collected about the specific stimulus detected by sensor of the first type 1 of the system 10 and—if present—the secondary parameters detected by the second type of sensors and the parameters relative to the driver's conditions and activity sensed by the third type of sensors are processed by the controller 2 including the electronic software which integrates all information to calculate the most probable future driver's reaction to these sensed parameters. In other words, the software uses suitable algorithms, as detailed in the following, in order to compute which is the most probable behavior (according to the model used in the software, the driver profile and the information coming from the previous driving session(s)) that the driver is going to show as a reaction to the detected stimulus(stimuli) by sensor(s) of the first type 1. This driver's most probable behavior is called in the following driver's "expected behaviour".

According to a preferred embodiment of the invention, the stimulus can be the alert signal generated by the controller 2, thus the software computes the expected driver's reaction to said alert signal.

To each change of the sensed parameter(s), due to a change of the internal/external stimulus(stimuli), the software updates the calculated expected driver's behavior in response to this(these) changed condition(s). According to an aspect of the invention, additionally, the software checks whether or not this calculated expected behavior is to be considered a standard behavior, as detailed below.

According to a preferred embodiment of the invention, the calculation of whether or not the expected driver's behavior is a standard behavior is performed by the software only with reference to the alert signal issued by the controller 2, i.e. an issued alert signal that has been caused for example by the fact that the thresholds set in the on board safety systems 20 have been exceeded or because an external system 10 or a road infrastructure has sent to vehicle 100 such an alert signal. In other words, the calculation of the type of expected behavior (i.e. whether it is a standard or a non-standard behaviour) is preferably performed only in connection with the expected behavior of the driver in response to the alert signal (=stimulus).

As said, in a different embodiment of the invention, signals coming from the controller 2 may always be presented to the driver and continuously updated, such as the information coming from a GPS. Therefore, there is not a single instant in which the driver is exposed to a single delimited-in-time alert signal, but there is a continuous flow of alert signals one after the other to which the driver may have different responses. One of this several continuous alert signals may be the stimulus which triggers a non-standard driver's behavior.

It is possible, under certain conditions, that the system 10 overrules the safety system 20. For example, the safety system 20 would issue an alert signal only under certain conditions, but different conditions could be set in the system 10 so that the system 10 issues anyhow the warning to the surrounding without having any first alert signal (=the signal emitted by the safety system 20) really emitted beforehand.

In order to calculate the most probable driver's reaction to the stimulus sensed by sensor of the first type 1, which in a preferred embodiment is the alert signal (which is indeed a stimulus emitted as a consequence of additional stimuli sensed by sensor 1), the software includes a first algorithm, in the following referred to as "expected driver's behavior algorithm", which calculates the expected behavior which the driver is probably going to show in the future, i.e. after having noticed the stimulus sensed by sensor of the first type 1, e.g. sensed the alert signal. Possible implementations of the aforementioned algorithm are a neural network trained with simulator or field operational test data, or a set of rules and equations, derived from field operational data and applied to the sensed information. These rules and equations may be for example generated by data mining processes on field operational data and can be adaptive. Kalman filtering or other processing methods may advantageously be used to integrate the surrounding information obtained by the sensors of the second type in the algorithm. Driver's modelling algorithms may advantageously be used as a basis to calculate the "expected driver's behaviour", and, as mentioned above, preferably also the driver's profile and the information coming from the previous driving session(s).

According to a preferred embodiment of the invention, the algorithm can also be adaptive and learn from the actual driver's responses; in this case either the neural network is re-trained, or the set of rules updated, or some parameters in the algorithm changed, or new additional rules are implemented over time.

The controller 2 may additionally include a read and write memory, a microprocessor, a CAN bus access and transmission, and/or other means of transmission. The algorithm may be coded into a script inside the controller memory or implemented via dedicated hardware.

The first algorithm may take into account driver workload, alertness (attention, distraction, drowsiness . . . ), and his/her health conditions. Driver's workload can be estimated from the information described above and sensed by the third type of sensors with ad hoc routines or already available on the CAN bus if such an estimator is part of the vehicle equipment (example: vehicles equipped with a Intelligent Driver Information System). Embodiments of additional third type of sensors are the following: driver awareness can be estimated for example by eye tracking systems, using cameras or the like or may be available on the CAN bus (as for instance a Driver Impairment Monitor system); the driver's health conditions can be estimated by cameras, EEG, ECG, EMG, etc.

The calculation of the behavior of the driver, i.e. the calculation of the most probable behavior of the driver in response to the stimulus sensed by sensor of the first type 1 by the first algorithm, represents the second step B of the method according to an aspect of the invention (see flowchart of FIG. 6).

It is known that the driver's reaction to a stimulus, such as the alert signal, can be of different types and can also include hazardous manuevers, such as hard braking or abrupt change of line, which may cause in the surrounding vehicle(s) a consequent abrupt reaction in order to avoid collision with ego vehicle 100 or an accident. As already mentioned, in the following, with "expected behaviour", the future driver behavior, i.e. the future driver's reaction to the stimulus such as the issued alert signal as calculated by the first algorithm (i.e. the "expected driver's behavior algorithm") is meant. With "standard behaviour" a non-hazardous behavior is meant, or in other words the behavior a driver maintains while driving ego vehicle if no threat, request for immediate action, stimulus that surprises the driver, stimulus relative to the driver's conditions etc., is detected. For each different sensed parameter, the standard behavior can also be parameterized accordingly.

From the above information collected by sensor of the first type 1, and by the eventual other signals coming from the other sensors of the second and third type (if present), the expected driver's behavior algorithm calculates whether or not the predicted reaction of the driver to the stimulus, such as the alert signal, is what the surrounding, e.g. the drivers of the other vehicles or other road users, expects. For this purpose, the electronic software includes a second algorithm, hereinafter referred to as "comparison algorithm", which compares the predicted driver's reaction calculated by the expected driver's behavior algorithm with what the surrounding traffic is normally expecting from the driver of ego vehicle 100, i.e. with the standard driver's behavior.

This comparison can be alternatively implemented by an additional dedicated hardware (not shown) instead of the second algorithm.

In a first embodiment, a threshold (for instance longitudinal and lateral acceleration or steering wheel rate, etc.) is set and the predicted driver's reaction is considered non-standard by the surrounding if it exceeds this threshold (or thresholds, if more than one is used). The threshold can be also a set probability that the non-standard manuever is going to happen.

In a second embodiment, this comparison may be also implemented by comparing the results of two models: one model calculates the expected behavior of the driver taking into account the stimulus detected by sensor of the first type 1, and a second model calculates the expected behavior of the driver, this model being identical to the first one with the exception that the specific stimulus which is expected to trigger a non-standard driver reaction has been neglected in the computation. The difference in the estimations made by the two models can be used to estimate whether the expected reaction can be considered standard or non-standard, i.e. a non-standard reaction is expected if the driver's expected behaviors calculated with the two models differ one with respect to the other, and if this difference exceeds or theses differences exceed one or more preset thresholds (within a certain tolerance margin). The comparison of the results obtained using the two models can be implemented by the second algorithm, which is preferably adaptive (i.e. it takes into account past history of predicted driver's behaviour).

In addition, the first and second algorithms, according to a preferred embodiment of the invention, can be customized for each individual driver of the ego vehicle 100, i.e. there are different algorithms for the different drivers who may drive the ego vehicle 100. At the beginning of each driving session, a driver's profile can be recorded by/loaded into the system 10.

This comparison step, i.e. the comparison between the calculated expected driver's behavior and what the surrounding expects in order to determine whether the expected driver's behavior is a standard behavior or an hazardous (non-standard) one, is step C of the method of an aspect of the invention (see again flowchart of FIG. 6).

If the driver's reaction predicted by the first algorithm is to be considered non-standard according to the calculation performed by the second algorithm, the method of an aspect of the invention includes a step of warning the surrounding traffic (step D in the flowchart of FIG. 6); so that the drivers of these vehicles or road users etc. can prepare themselves to react to a possible hazardous future driving behavior from the ego vehicle 100 in order to increase traffic safety and efficiency.

For this purpose, the system 10 further includes a transmission device 5, to transmit a warning signal, which includes the information of a possible non-standard/hazardous predicted driver's reaction to the surrounding traffic. The transmission device 5 is preferably activated by the controller 2 which is apt to generate the warning signal in case the predicted behavior is found non-standard by the second algorithm.

Different warning signals, or different intensities/modulations of such warning signals, for the same non-standard behavior can be envisaged, depending on how "dangerous" the future manuever is expected to be. For example, in case hard braking is expected because the expected deceleration is calculated to be above a certain threshold, the triggered illumination of the stop/back lights of ego vehicle 100 can be of different intensity and/or it can be modulated in intensity and/or frequency according to the value by which the threshold has been exceeded. If the expected deceleration is very close to the threshold, a quick illumination of the vehicle's back lights can be a suitable warning signal, if the threshold is expected to be exceeded by a relatively large amount, then a fast blinking and/or a more intense illumination of the back lights can be adequate.

In case the expected driver's behavior is calculated to be a standard behavior, the controller 2 keeps monitoring the incoming stimulus signals from sensor of the first type 1 without issuing any warning signal to the surrounding traffic.

From the controller 2, transmission of warning signals depending on the future driver's reaction can be implemented by using the CAN bus and/or any standard transmission means in the vehicle. Transmission device 5 can be for example stop lights, blinking lights, the horn, etc., or extra ad-hoc transmission lights or a sound generator.

In a different embodiment, transmission of the warning signal can also take place through wireless communication, thus transmission device 5 is a wireless transmitter. For instance, transmission of the second warning signal can take place through a Wireless Local Area Network ("WLAN") transferring User Datagram Protocol ("UDP") packaged on Transmission Control Protocol/Internet Protocol ("TCP/IP") according, for instance, to the Continuous Air interface for Long and Medium Distances ("CALM") architecture and guidelines. Transmission can use the frequencies available for cooperative systems transmission or other frequencies open for transmission, or the GSM network. This second transmission implementation (wireless communication) implies the presence of vehicles, road users and/or infrastructures in the surrounding which are able to understand the broadcasted or narrowcasted warning signal emitted by the transmission device 5.

Intelligent vehicles/infrastructures can use this information on future driver's behavior in different ways: communicating it to the drivers or vulnerable road users nearby or intervening on the surrounding vehicles/infrastructures to make these vehicles more prompt to react (for instance by pre-charging the vehicles brakes).

It is to be understood that the calculations performed by the software including the first and second algorithm triggered by a signal from the sensor of the first type 1 and the broadcasting of the warning signal, all takes place within the time interval between the detection of the stimulus by sensor of the first type 1 and its elaboration by controller 2 and the actual driver's response to it. Indeed, as an example, the time elapsed between the alert signal and the real driver's reaction is usually long enough to allow the software to instruct the controller 2 to issue the warning before the driver starts any action.

According to a further embodiment of the invention, an additional step of the method of an aspect of the invention is encompassed. After the transmission of the warning signal (or together with this transmission), an active modification of the status of one or more in-vehicle system(s) of the ego vehicle 100 other than system 10, or of the status of the system(s) of surrounding vehicles also including the system 10, is performed. This modification is done in order to further enhance traffic safety and efficiency. As a possible modification, a pre-filling of the brakes either of ego vehicle 100 and/or of the surrounding vehicles can be a suitable example. The pre-filling is performed through a command of the controller 2 to the braking system, sent for example via wireless communication.

Alternatively, this further step, i.e. the modification of other vehicle's systems (such as the brakes system), can replace the transmission of the warning signal or, in other words, the signal emitted by the controller in order to modify the status of a system other than the system 10 to enhance traffic safety and efficiency can be considered as the warning signal itself.

In the following, a network of vehicles 100 equipped with the system 10 is described. There is no need for all vehicles to be equipped with the system 10: in a simple embodiment of such a implementation of a network of vehicles, a single ego vehicle 100 comprises the system 10, while a plurality of other vehicles include a receiver to receive the information about the future driver's behavior from the system 10 (an example of such a network could be a convoy of vehicles where the leading vehicle is equipped with such a system 10 while each of the following vehicles is equipped with a receiver). In a more complex embodiment of such an implementation of a network of vehicles, each one of the ego vehicles 100 belonging to the network includes a system 10. In the intermediate realizations, some of the vehicles belonging to the network may include a system 10, while others may include a receiver to receive signals from systems 10 installed in other ego vehicles. Each one of the systems 10 predicts the future behavior of the driver driving his/her own ego vehicle depending on the signals received by sensor of the first type 1 of that ego vehicle. With a cooperative approach, the electronic software installed in a specific system 10 on an ego vehicle 100 can also consider the results from all calculations made by the software of all systems 10 installed in the vehicles around it in order to optimise the algorithms and the corresponding calculation results. For example, in case the algorithm of system 10 on ego vehicle 100 is aware, because it has received such information, that the expected driver's behavior of an additional vehicle in front of the own ego vehicle is to change lane, because the system 10 on that other vehicle has calculated from the signals received by the turn indicator and the steering wheel movements that this is the probable manuever of that other vehicle, then the algorithm of system 10 mounted on ego vehicle 100 will modify the threshold at which the warning signal, such as an activation of the turn indicators, is issued (in this case it is lowered).

In this embodiment of a network of vehicles, in order to arbitrate the different signals coming from the different systems 10 on board the various vehicles, a master controller (non shown in the figures) is preferably present. The master controller arbitrates the different signals coming from the different systems 10 for increasing traffic safety and efficiency and decides which signals to prioritise or which to disregard. In other words, the network has to consider the "global" best solution in order to increase traffic safety and efficiency, global in the sense that it is so for the majority of the vehicles belonging to the network. The optimisation can be done (and it is preferably done) at a network level and not only at the vehicle level.

The information related to the expected drivers' behaviors of the surrounding vehicles can be transmitted to ego vehicle 100 by the same wireless transmission device used to transmit the warning signal to the surrounding. In addition to the expected driver's behavior, all types of information can be shared among systems 10, such as partial computations, signals sensed by a sensor 1 in a different vehicle, alert signals, and warning signals.

This embodiment of the invention where a network of systems 10 is considered, enables a faster computation (because distributed among the different systems 10) and reduces the amount of data to be transmitted (because pre-processed). This network can be considered as a co-operative system.

EXAMPLE 1

Longitudinal Control

In this first example, the system and method of an aspect of the invention have as a main goal to prevent rear-end collision among vehicles.

The system 10 includes a Frontal Collision Warning (FCW) system 20 installed in the ego vehicle 100, the inputs of the sensors of the first type 1 of which are used by the first algorithm to predict the driver's behavior. In particular, the driver behavior is predicted using a first algorithm based on average response to frontal collision warnings (=alert signal). The system 10 may advantageously include an additional sensor of the second type, e.g. a velocity sensor, which measures the variations in velocity of the ego vehicle 100.

In case the first algorithm predicts that the expected behavior of the driver to the frontal collision warning signal is hard braking (for example calculating the expected deceleration of the vehicle: step B in FIG. 6), which is considered by the second algorithm as a non-standard behavior (the deceleration is above a certain threshold that indicates hard braking; step C in FIG. 6), the back stop lights of ego vehicle 100 are used as the transmission device 5 to target this information to the following vehicle(s) before the "real" braking is initiated by the driver (step D in FIG. 6).

In more detail, braking manuevers can be predicted from the knowledge coming from field data. Field data show that, after a FCW signal is issued, there is a high probability in specific surrounding conditions for drivers to brake. How drivers brake and how hazardous this manuever can be for the surrounding traffic depends on many factors such as for instance the speed of the vehicle. The speed of the ego vehicle 100 therefore is a good indicator for predicting or estimating the probability of a potential hazardous manuever by the driver in case it exceeds a certain predetermined threshold.

It has been shown that on average when the velocity is above a certain threshold (and at least under certain conditions of traffic, weather, driver's age and alertness, etc.), the driver reacts by braking very hard with a delay of circa 1500 ms after the frontal collision warning signal (=alert signal) has been issued by the safety system 20 because the distance and speed (used as parameters either alone or as a proper combination of them) between the ego vehicle 100 and the preceding vehicle is lower than a corresponding predetermined threshold.

FIG. 2 shows the average driver behavior when receiving a frontal collision warning. The upper curve represents a visual representation of the alert signal sent by the controller 2 versus time, while the lower curve depicts the braking action performed by the driver versus time (i.e. the deviation from a straight horizontal line represents the intensity of the braking action, while the straight horizontal line represents "no braking action").

The predicted braking manuever can be quantified in terms of expected deceleration, i.e. the first algorithm calculates the expected deceleration impressed by the braking action. In the comparison algorithm, a threshold on deceleration (for example 3 m/s2 for cars and 2 m/s2 for trucks) is set and the decision that manuever is hazardous depends on whether the calculated expected deceleration is above this threshold. The threshold is set a priori based on field data.

Instead of using one single threshold on expected deceleration, a combination of signals (predicted and real) can be used; further thresholds can be adaptive and not decided a priori. The calculation of the expected deceleration by the first algorithm may take on average less than 5 ms.

In principle, by inducing hard braking, which is not a standard or normal behavior of the driver, the Frontal Collision Warning (FCW) system 20 potentially increases the probability of rear-end collision with the vehicle following the ego vehicle 100. However, according to the method of an aspect of the invention, the system 10 predicts via the expected behavior algorithm and the comparison algorithm the fact that the behavior of the driver in reaction to the alert signal is going to be a non-standard one and thus within the typical delay of circa 1500 ms before the hazardous behavior actually takes place, the following vehicle can be warned by pre-activating the ego vehicle stop lights (or other in-vehicle acoustic or visual communication means) before the action of braking.

The controller 2 activates the stop lights (different embodiments of this activation are possible: blinking at different speed, different intensity, etc.) via the CAN bus or dedicated wiring.

FIG. 3 schematically shows a possible application (use scenario) of the system 10 and method of example 1 in a roundabout 15.

In FIG. 3 vehicles 100, V1, V2 and V3 are approaching the roundabout 15. The vehicle 100 (equipped with a FCW system 20) is moving towards the roundabout 15 because the vehicle V1 in front also is moving. In the situation as depicted in the FIG. 3, the vehicle's 100 driver is looking at the vehicle V2 coming from the left and does not realize that the vehicle V1 in front, all of a sudden, decided to stop. In the vehicle 100, a FCW signal is emitted, and the "vehicle's 100 driver sees the alert signal of the FCW system in his peripheral view and brakes very hard. The driver of vehicle V3 directly behind the vehicle 100 is not prepared to such a non-standard reaction from the vehicle 100 in front and will not react in due time with the consequence that vehicle V3 probably will hit the vehicle 100.

In case the system 10 is installed in the ego vehicle 100, the ego vehicle 100 warns the vehicle V3 of the expected non-standard behavior of the driver of ego vehicle 100, i.e. the hazardous hard braking by emitting the warning signal (for instance by blinking the back stop lights) that warns the driver of vehicle V3, thus enabling the driver of vehicle V3 to activate the brakes of his vehicle V3, too, i.e. the driver of vehicle V3 has more time to stop his vehicle V3, thereby reducing the risk of a collision with ego vehicle 100.

EXAMPLE 2

Longitudinal Control

The system 10 is similar to the system of example 1 having a FCW' system installed, but an adaptive model response is applied as a first algorithm which senses the actual driver's response after the alert signal and updates the model after each occurrence in order to provide a more accurate and customized prediction of the driver behavior.

Alternatively to the back stop lights, a wireless communication is used as transmission device. In case a hazardous driver's behavior is predicted, a pre-filling of the brakes of the following vehicle using wireless communication is envisaged.

Many factors influence driver's behavior. Further, different drivers have different reactions and responses to the same stimulus. By taking into account driver-specific responses, the predicted driving manuever can be optimised and customized for different drivers. An algorithm inside the controller 2 senses the CAN information and, based on a set of adaptive rules coming from driver's previous reactions, predicts the driver behavior (generally a braking manoeuvre). Further, the first algorithm then checks the actual driver's reaction and updates the model. This algorithm may for instance rely on neural networks. Integration of information may use Kalman filtering and other advanced signal processing methods.

Information on the non-standard braking manuever is transmitted to the surrounding vehicles via wireless communication.

The system 10 has wireless capability and can communicate with other vehicles including system 10 and/or with infrastructures in the surroundings. Intelligent vehicles (i.e. vehicles hosting a system 10) can use this information to pre-charge their brakes. Intelligent infrastructures (i.e. infrastructures capable of receiving and decoding the signals sent by system 10) can use this info to optimally control traffic-lights close to an intersection (for example to stop other vehicles from approaching the ego vehicle 100).

EXAMPLE 3

Lateral Control

In this example, the system 10 and method of an aspect of the invention are used to prevent a side collision while changing lane.

The system 10 includes a standard Lane Departure Warning ("LDW") system 20 in the ego vehicle 100 and predicts the driver's behavior based on an average response to lane departure warnings. The warning signal is broadcasted to the following vehicle by using the appropriate indicators lights (i.e. by activating the indicator lights on the left side of ego vehicle 100, if the driver of ego vehicle 100 is expected to move to the lane on the left side of the lane currently used by the ego vehicle 100, and the indicator lights on the right side of ego vehicle 100, if a change to the lane on the right side is expected).

A lane departure warning signal (=alert signal) may induce sudden and abrupt steering, thus increasing the probability of a side collision. However, the system 10 predicts that this abrupt manuever is going to happen circa 1500 ms before it actually does and, during this time, pre-warns the vehicles in the surrounding by activating the indicators light in the direction of predicted steering (for the details of the issue of the alert signal issued by the LDW system to the driver and the actual steering action of the driver of ego vehicle 100 see FIG. 4 which is the analogue of FIG. 2 of the previous example 1, in this case the lower curve represents the steering manuever of the driver of ego vehicle 100).

More in detail, the step of the method of an aspect of the invention are the following:

Step A: Information acquisition: Occurrences of LDW signals are sensed. The system 10 is implemented in an ECU (=controller 2 in FIG. 1) and is connected to the CAN bus where LDW information and vehicle information (e.g. velocity) are sensed and distributed. Additional info can be gathered by extra-sensors or wireless communication and could be integrated in the system.

Step B: Prediction of driver's behaviour: The sensed LDW signal is likely to induce a steering manuever. Depending on the level of alertness of the driver and on other factors, this steering manuever can be exaggerated and hazardous for the surrounding traffic. The algorithms inside the ECU 2 sense the information provided via the CAN bus and, based on a set of rules coming from field data (how a driver reacts to LDW signals in real traffic), predict the driver behavior (generally a steering manoeuvre). Step C: Comparison: The steering manuever predicted by the model is compared with the standard manuever which is expected by the surrounding. The predicted steering manuever can be quantified in terms of expected lateral movement. The comparison algorithm has a threshold on lateral movements (the comfort limits for a vehicle are generally set at circa 1.5 m/s2 for the lateral acceleration of the vehicle) and decides that the manuever is hazardous if the expected lateral movement is above this threshold. This threshold is set a priori based on field data. Instead of using one single threshold on expected lateral movements, a combination of signals (predicted and real) can be used; further thresholds can be adaptive and not decided a priori.

Step D: Warning signal: in case a hazardous steering manuever is expected to happen, a corresponding information on that hazardous steering manuever is transmitted to the following vehicles via activation of the emergency lights. The system 10 activates the emergency lights via the CAN bus or dedicated wiring. Other in-vehicle lights or dedicated lights can be used to warn the surrounding.

FIGS. 5a and 5b show possible applications of the system 10 (use scenarios) and the method of example 3. In FIG. 5a, the vehicle 100 is drifting to the left because of inattention of the driver of the vehicle 100. The vehicle V1 on the side right to vehicle 100 assumes the vehicle 100 is changing lane and starts the same manuever, i.e. also moving to the left. The vehicle 100 receives a lane departure warning signal from its LDW system and the driver steers the vehicle 100 suddenly and profusely back to the right in order to stay in the original lane thereby hitting the vehicle V1. Since more than one vehicle can assume the vehicle 100 is changing lane and start the same manuever, a sort of domino effect can be foreseen and is illustrated in FIG. 5b where an additional vehicle V2 is shown moving to the left, too.

In case ego vehicle 100 is equipped with system 10 according to an aspect of the invention, the predicted driver's response from the system 10 can be used to reduce the risk of such a side collision and the domino effects, where more than one vehicle is involved because of an abrupt driver's response, by issuing a warning signal to the surrounding before the hazardous manuever, i.e. the steering correction of the driver of ego vehicle 100, happens. System 10 can take into account this domino effect using, for instance, wireless communication.

EXAMPLE 4

Lateral Control

As in example 3, but wireless communication is used to warn the other vehicles of the hazardous manuever. In case of wireless communication, the warning can be extended to all vehicles which would be influenced by the abrupt steering manuever in a sort of domino effect. The steps A-C of method of an aspect of the invention are identical to these described in connection with example 3, while step D is replaced by the following:—Step D: Information on the expected hazardous steering manuever is transmitted to the surrounding vehicles via wireless communication. The system 10 has wireless capability and can communicate with intelligent vehicles and infrastructures in the surroundings. Wireless communication may happen by using a WLAN transferring information in UDP packages via TCP/IP or by broadcasting the information. Intelligent vehicles can use this information to pre-charge the brakes. Intelligent infrastructures can use this info to optimally control traffic-lights close to an intersection (for example to stop other vehicles from approaching the vehicle that is equipped with the system 10). Further domino effects can be controlled since the cooperative vehicles have an understanding of all—surrounding traffic.

EXAMPLE 5

Animal Crossing

In this case, the system 10 is used to predict the vehicle driver's reaction when an animal suddenly crosses the road. Sensor of the first type 1 is for instance a camera with an algorithm able to recognize when an animal is suddenly crossing the road. Further, sensor of the first type 1 and/or controller 2 includes an algorithm to distinguish between a small animal, such as a dog, and a big animal (specifically a moose). Drivers are educated to react with very different manuevers when driving fast on the road and an animal crosses the road depending on the size of the animal. Specifically, if the animal is small (e.g. a dog) the driver presumably will not make any abrupt manuever and will just drive toward the animal since the vehicle (in this case a car) is designed to absorb the hit; however, if the animal is a big animal instead (a moose for instance), usually a car cannot absorb the impact completely and there is a big risk that the animal will be hitting the wind screen of the car. Therefore, in this latter situation, the car driver presumably will make a fast manuever to the side in order to avoid the collision with the animal. The system 10 can take into account this information and integrate it into a model aimed at predicting the driver's manuever. In particular, an alert signal can be issued to the driver if a big animal is detected. Due to the fact that this alert signal is most probably going to trigger the non-standard fast manuever to avoid the animal, a warning signal is issued to the surrounding. Once again, this information can be transmitted in many ways to the surrounding vehicles and increase safety by alerting the surrounding vehicles before their drivers could react.

EXAMPLE 6

Driving coaching h this example, the system 10 is used to increase fuel efficiency of the surrounding vehicles by sending information about the predicted behavior of ego vehicle 100.

The system 10 is able to predict when the driver of ego vehicle 100 is going to brake in such a way that the deceleration is above a certain threshold and thus this information is sent to the following traffic to decrease domino delays in braking reaction which would need to be compensated with harder braking. The purpose of this implementation is to create a more smooth control of the velocity for the vehicles following the ego vehicle 100 which implies a more optimised use of fuel.

Step A: Information acquisition: GPS and driving coaching information, as well as surrounding information and driver-related information, are recorded.

Step B: Prediction of driver's behaviour: The system 10 can estimate the extent to which the driver is going to brake by taking into account the itinerary from the GPS and driving' coaching information, as well as surrounding information and driver-related information. For instance, if the driver is approaching really fast a turn which he/she is supposed to take accordingly to the GPS itinerary, then the algorithm in the system would compute how hard the driver needs to brake in order to make if.

Step C: Comparison. When this estimation of the braking would be above a certain level, it can be assumed with sufficient margin of tolerance that the following vehicle/s would also need to brake. The manuever is then considered as being non-standard.—Step D: Warning signal: The back stop lights of ego vehicle 100 for instance start to blink. By anticipating the information of the vehicle's 100 future braking, the following vehicles can decelerate earlier, less extensively, and more safely, and this would result in a better use of fuel and brakes. Depending on how many vehicles are following the ego vehicle including system 10, this system 10 could also avoid chain end-rear collision by giving more time to the drivers to prepare for the braking manuever. In this later case, wireless communication may be used to make sure the information is broadcasted to all following vehicles (and not just to the first following vehicle as it would happen using pre-activation of the back stop lights). If the ego vehicle 100 is equipped with a driving coaching system, then this information can be used to "coach" the following vehicles by taking into account how the driving coaching system instruction are going to affect the driver future manuevers.

It should be noted that in this case preferably no alert signal is emitted to the driver, who simply reacts to the stimuli coming from the GPS monitor (which, as said, can be considered as a continuum of alert signals) or loudspeaker emitting an alert signal such as "turn right!".

EXAMPLE 7

Infrastructure's Stimulus

In this case, the system 10 is getting the "stimulus" which is going to trigger the communication of the warning signal to the surrounding from an infrastructure.

Step A: Information acquisition: Traffic lights are assumed to be cooperative and they can send their status to system 10. The system 10 thus collects the information about the traffic lights' status (red, green, yellow) and the switching time from one status to the other (for instance still 5 seconds of red status remaining before switching to yellow or "directly to green). Additionally, the system 10 includes sensors to detect the vehicle's velocity and the distances between the ego vehicle 100 and the traffic lights.

Step B: Prediction of driver's behaviour: The system 10 can estimate the remaining time before reaching the cooperative traffic lights. The braking time needed, which is based on the expected driver's behavior in case the traffic light's status is "red", is calculated.

Step C: Comparison: If the ego vehicle 100 is travelling too fast and getting too close to a traffic light which is going to be red in the next few seconds, the algorithm calculates that the driver will brake hard, which is not a standard behavior, and will initiate the pre-lighting of the braking lights (back stop lights).

Step D: Warning signal: The back stop lights for instance start to blink. By anticipating the information of the ego vehicle's future braking, the following vehicles can decelerate earlier, less extensively, and more safely, and this would result in a better use of fuel and brakes. Depending on how many vehicles are following the ego vehicle including system 10, this system 10 could also avoid chain end-rear collision by giving more time to the drivers to prepare for the braking manuever.

In this case, the system 10 provides a warning signal based on the stimulus from traffic light turning from green to red.

EXAMPLE 8

Reducing domino effect risks Returning to the example 1 depicted in FIG. 3, a modification is introduced (i.e. a further vehicle V4 is added) as shown now in FIG. 7. In this new use case, both vehicles 100 and V3 each includes the system 10. As can be seen, a vehicle V4 is behind vehicle V3.

The ego vehicle 100 is moving because the vehicle V1 in front also is also moving. The driver of ego vehicle 100 is looking at the vehicle V2 coming from the left and does not realize that the driver of vehicle V1 in front of his/her own ego vehicle 100, all of a sudden, decided to stop his vehicle V1 In the ego vehicle 100, a FCW signal is emitted, the driver of ego vehicle 100 sees the alert signal in his peripheral view on the monitor installed in ego vehicle 100 and brakes very hard. The system 10 of ego vehicle 100 already calculated the fact that most probably the driver was going to brake hard in response to the alert signal coming from the FCW system and has warned the vehicle V3 about the predicted un-expected non-standard manuever of ego vehicle 100. Consequently, the system 10 in vehicle V3 uses this information (i.e. the warning signal issued by the system 10 of the ego vehicle 100 becomes the stimulus for the second system 10 mounted on vehicle V3) to predict an un-expected non-standard manuever of the vehicle V3 (again hard braking) and transmits this information, again through a warning signal, to vehicle V4. In other words, the presence of a plurality of systems 10, one for each vehicle, will reduce the risk that a series of individual collisions between vehicles" in the same lane in form of a domino effect will occur.

EXAMPLE 9

Network of Systems to Enhance Traffic Safety and Efficiency

In this example depicted in FIG. 8, the system 10 of a first vehicle is getting a stimulus from another system 10 of another vehicle.

In FIG. 8, each one of the depicted vehicles V1-V4 includes a system 10, forming a network of ego vehicles. Then, in any moment each one of the systems 10 is aware of the expected future behaviour(s) of the driver(s) of the other vehicle(s) (because the systems 10 communicate in a co-operative manner with each other in regard of the future expected behavior of the drivers of the vehicles). Advantageously, traffic lights are considered to be co-operative as well (i.e. sending information to the systems 10 of the co-operative network about their actual status).

The processes conducted in the individual vehicles V1-V4 are the following:

Vehicle V1—The system 10 of this vehicle computes the speed of the vehicle itself. Being the vehicle V1 too fast on road R1, and the traffic light TL1 turning red, it predicts a non-standard manoeuvre: the driver of vehicle V1 will not be able to stop the vehicle V1 at the red traffic light TL1 before the crossroad with road R2, i.e. vehicle V1 will pass the crossroad with road R2 with a red light TL1. System 10 thus sends the information about this predicted non-standard manuever wireless to the other vehicles V1-V3.

Vehicle V2—The system 10 mounted at vehicle V2 on road R2 receives from the system 10 of vehicle V1 the information that there is going to be some non-standard manuever (possibly even which manuever that would be) so the system 10 in vehicle V2 predicts some non-standard braking manuever of the driver of vehicle V2. The information about this predicted non-standard manuever is sent by vehicle V2 wireless to the other vehicles V1, V3, V4.

Vehicle V3—The system 10 mounted at vehicle V3 conducts the same process as vehicle V2 and the information about the predicted non-standard manuever of vehicle V3 is sent by vehicle V3 wireless to the other vehicles V1, V2, V4.

Vehicle V4—The system 10 mounted at vehicle V4 receives, in addition to the information of the vehicle V1 about its expected non-standard manuever, the information from vehicle V2 and V3 about their expected non-standard braking manuevers.

What will happen in this scenario is the following:

Vehicle V1—This vehicle passes the intersection between road R1 and road R2 with a red traffic light TL1 and activates the issue of a FCW signal both in vehicle V2 and vehicle V3. According to the actual set up of the network of systems 10 this signal may come from the system 10 of either one of the vehicles V2, V3 or from the system 10 in V1 itself.

Vehicle V2—The information sent by system 10 of vehicle V2 turns on the braking lights of vehicle V2 before the driver of vehicle V2 brakes hard to avoid hitting vehicle V1 which is passing the crossroad. The driver of V2 has this non-standard behavior as a reaction of the FCW signal of vehicle V2. In addition, the system 10 of vehicle V2 causes the system 10 of vehicle V4 to pre-fill the brakes in vehicle V4.

Vehicle V3—The system 10 of this vehicle V3 forces the braking lights of vehicle V3 to light up before the driver of vehicle V3 brakes hard to avoid hitting vehicle V1, which is passing the crossroad.

Vehicle V4—The system 10 of vehicle V4 foresees an unpredicted driver's braking manuever and turns on the braking light to alert a potential following vehicle (which may not be part of the network).

EXAMPLE 10

Network with Infrastructure

With now reference to FIG. 9, the following case is considered.

Vehicle V1 is approaching the traffic light TL1 along road R1 at a speed which is too high. The system 10 of vehicle V1 calculates the fact that the vehicle 10 is too fast and that the traffic light TL1 at the crossroad with road R2 is turning red. The algorithm of the software in system 10 of vehicle V1 will predict a non-standard manuever of the driver of vehicle V1, namely that the vehicle V1 will pass the traffic light TL1 when the light is red.

The system 10 mounted on vehicle V2 on road R1 receives from the system 10 a warning signal related to the fact that there is going to be some non-standard manuever (possibly even which manuever that presumably would be) such that the system 10 mounted at vehicle V2 predicts some non-standard braking manuever of the driver of vehicle V2.

The systems 10 of both vehicles V1 and V2 send the warning signals about the predicted non-standard manuevers of vehicles V1 and V2 to "intelligent" traffic lights TL1 and TL2 which receive the information.

The intelligent traffic lights TL1 and TL2 sense with appropriate sensors that there are no other vehicles or vulnerable road users present in the neighbourhood of the crossing and change the status of the traffic light TL1 from red back to green. The systems 10 in vehicles V1 and V2 re-perform the calculations—sensing that the relevant parameter (the light of the traffic light TL1) has been changed and is now green again—and do not predict any non-standard manuever anymore. Vehicles V1 and V2 will continue their driving in the anticipated direction and will pass the intersection with road R2 without any other vehicle having to perform any hazardous manuever or receiving warning signals.

EXAMPLE 11

Network with Master Controller

In this example a network of systems 10 includes additionally a master controller that can be employed in order to collect information from the network of—system and to use this information to optimise the traffic safety/efficiency of the whole network instead of optimising the system response at the individual vehicle's level (as in the examples above).

In this example, it is assumed a traffic situation where the majority of the vehicles are equipped with a system 10. If information coming from the systems 10 is shared and combined at an overall level, traffic safety and efficiency can be improved even more than when information of a system 10 of a single vehicle is sent out to, and used by, the other vehicles in the immediate surrounding of the vehicle with the system 10 (as for instance in example 1 above) or is causing a chain of effects to the network (as for instance in examples 8 and 9 above).

It has been already shown in example 8 how a chain of individual decisions of systems 10 may increase safety in an intersection when a vehicle V1 is going to pass the intersection at red light. The network of example 9 includes in this specific embodiment a master controller, i.e. a unit that is able to receive (a) information coming from systems 10 from the vehicle network, and, if present, also (b) environmental information, (c) surrounding traffic information, (d) driver's information, and (e) intelligent infrastructures' information; and that is also able to process this information and to communicate with the surrounding. If, in the example of FIG. 8, the behavior of vehicle V1 is due not only to speed of the vehicle V1 but also due to the fact that the driver of vehicle V1 is distracted, in such a case the master controller "understands" that, changing the status of the traffic light TL1 from red to green, the driver of vehicle V1 wouldn't need to perform any un-expected manuever. Further, vehicles V2 and V3 would not need to create a FCW signal which may potentially trigger a hazardous behavior of their respective drivers.

The master controller enables a safety network optimisation, which results, in this specific example, in reducing the probability of an un-expected non-standard manuever to happen instead of providing warnings to prepare the surrounding traffic to react if such un-expected manuever happens. Therefore, in this case the warning signal is the signal emitted by the master controller to the traffic light (TL1 in FIG. 8) in order to change the status of said traffic light (from red back to green in the example 10 described in FIG. 9), and this signal has been triggered by the information coming from the systems 10 of vehicle V1.

A master controller can be embedded in the traffic light or in an intelligent infrastructure, but can also be housed in some (preferably extra-safe) system 10 mounted at a vehicle with extended calculation/transmission power.

The invention claimed is:

1. A method for enhancing traffic safety and efficiency for vehicles by transmitting information on an expected behavior of a driver of an ego vehicle in response to a stimulus, including elaborating a stimulus signal function of a sensed parameter of the stimulus, the calculating the expected future driver's behavior in response to the stimulus using the stimulus signal, comparing the expected future driver's behavior with a standard driver's behavior, generating a warning signal to be emitted to the surrounding of the ego vehicle in case the expected future driver's behavior is not a standard behavior.

2. The method according to claim 1, including the step of emitting the warning signal to the surrounding.

3. The method according to claim 1, including, prior to the step of elaborating a stimulus signal function, a step of sensing a parameter of the stimulus in order to generate the stimulus signal function of the sensed parameter.

4. The method according to claim 1, wherein the step of calculating an expected future driver's behavior includes a step of elaborating information derived from field operational data.

5. The method according to claim 1, wherein the step of calculating an expected future driver's behavior includes an adaptive step and/or a learning step based on the driver's actual responses.

6. The method according to claim 1, wherein the step of sensing at least, one parameter comprises a step of sensing a plurality of different parameters related to the ego vehicle and/or to its surrounding and/or to the driver's physical condition.

7. The method according to claim 1, wherein the step of sensing at least one parameter comprises a step of emitting an alert signal.

8. The method according to claim 1, wherein the step of emitting a warning signal to the surrounding and/or the step of emitting an alert signal includes a step of a wireless communication transmission.

9. The method according to claim 3, wherein the step of sensing at least one parameter comprises a step of receiving at least one warning signal emitted by a vehicle other than the ego vehicle and/or by a road infrastructure.

10. The method according to claim 2, wherein the step of emitting a warning signal to the surrounding of the ego vehicle comprises a step of transmitting the warning signal to the surrounding vehicles and/or infrastructures.

11. The method according to claim 2, including, after the step of emitting a warning signal, a step of an active modification of the status of an in-vehicle system.

12. The method according to claim 3, including, before the step of sensing a parameter, a step of an acquisition of the driver's specific data and/or of the previous driving session data.

13. A system to enhance safety and traffic efficiency for vehicles by transmitting information on an expected behavior of a driver of an ego vehicle in response to a stimulus, the system comprising:

a sensor of a first type apt to sense a parameter related to the stimulus and to generate a stimulus signal function of the sensed parameter, a controller in communication with the sensor of the first type and apt to process the stimulus signal from the sensor, wherein the controller is apt to compute the expected driver's behavior based on the stimulus signal from the sensor of the first type and to compare the expected driver's behavior to a standard behavior, and a transmission device adapted to transmit to the ego vehicle's surrounding a warning signal in case the expected driver's behavior is not a standard behavior.

14. The system according to claim 13, wherein a software resident on a storage medium (4) is in signal communication with the controller and wherein the software is apt to compute the expected driver's behavior based on the stimulus signal from the sensor of the first type and to compare the expected driver's behavior to a standard behavior.

15. The system according to claim 13, wherein the transmission device is a wireless transmitter.

16. The system according to claim 13, comprising a safety system including an emitter to emit an alert signal.

17. The system according to claim 16, wherein the safety system is a Forward Collision Warning system or a Lane Departure Warning system or a Lane-Change Warning system or a Curve Speed Warning system and wherein the alert signal is a Forward Collision Warning signal or a Lane Departure Warning signal or a Lane-Change Warning signal or a Curve Speed Warning signal, respectively.

18. The system according to claim 13, comprising at least one sensor of a second type sensing additional parameters relating to the vehicle's external or internal conditions and/or at least one sensor of a third type sensing additional parameters relating to the driver's physical conditions.

19. A network of vehicles, at least one of the vehicles including a system according to claim 13, and the remaining vehicles of the network not including such a system but comprising at least one receiver apt to receive signals from the system, each such system present in the network of vehicles comprising a wireless transmission device apt to communicate with the systems and/or the receivers of the other vehicles present in the network.

20. The network of vehicles according to claim 19, including a master controller that is in communication with the systems and/or the receivers of the vehicles of the network in order to prioritise and/or disregard within the frame of the communication signals coming from the systems of the network of vehicles.

21. A vehicle apt to be part of a network of vehicles according to claim 1.

22. A non-transitory computer readable medium comprising a computer program comprising computer program instructions adapted to perform, when loaded into a computer memory, all the steps of a method according to claim 1.

23. A non-transitory computer program product comprising a computer-readable medium embodying program instructions executable by at least one processor to perform all the steps of a method according claim 1.

* * * * *